No. 822,425. PATENTED JUNE 5, 1906.
W. M. BRADSHAW.
BEARING FOR MEASURING INSTRUMENTS.
APPLICATION FILED JUNE 30, 1904.

WITNESSES:
Fred. N. Miller
Chas Harkne

INVENTOR
William M. Bradshaw
BY
Wesley L. Carr
ATTORNEY

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

BEARING FOR MEASURING INSTRUMENTS.

No. 822,425.   Specification of Letters Patent.   Patented June 5, 1906.

Application filed June 30, 1904. Serial No. 214,840.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Bearings for Measuring Instruments, of which the following is a specification.

My invention relates to bearings, and particularly to bearings for shafts or spindles which carry light rotatable parts such as are used in measuring instruments.

My invention has for its object to provide a bearing for electrical measuring instrument shafts or spindles, in which the friction is reduced to a minimum and which because of its flexibility is unaffected by vibration due to the operation of the instrument.

The operation of alternating-current electrical apparatus is always accompanied by more or less vibration, caused by reversals of the magnetism in the iron cores, and in measuring instruments or other very light apparatus this vibration may be transmitted to the rotatable elements and their bearings, and thus be productive of noisy operation.

My invention provides means for the prevention of noise in the operation of alternating-current-measuring instruments, and such means is illustrated in the accompanying drawings, in which—

Figure 1:
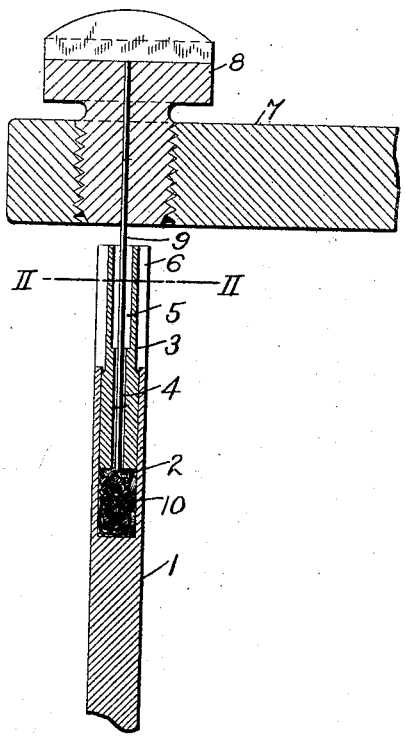
Figure 2:
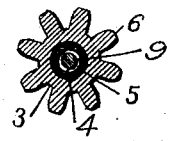

Figure 1 is a vertical sectional view of parts of an instrument constructed in accordance therewith; and Fig. 2 is a sectional view on line II II of Fig. 1, drawn to a larger scale.

The shaft 1, which normally stands in a vertical position and is provided with the usual jewel step-bearing, (not shown,) has a cylindrical recess 2 in its upper end, into which a tubular shaft extension 3 is tightly fitted. The shaft extension 3 has two cylindrical bores 4 and 5 of different diameters, the end having the smaller bore 4 being seated in the recess 2 in the end of the shaft 1. The portion of the extension 3 which projects from the end of the shaft 1 may be provided with teeth 6, so as to serve as a pinion for driving a suitable train of gears (not shown) for the purpose of registering the number of rotations of the shaft.

Threading into a frame 7 is a set-screw 8, which is provided with a pin 9, that projects through the shell 3 and constitutes a bearing for the lower end thereof. The cavity between the bottom of the recess 2 and the lower end of the extension 3 may be filled with felt or other suitable absorbent material 10, which if saturated with jeweler's oil or other suitable lubricant will supply the same to the bearing by capillary attraction. If the felt absorbs all of the lubricant in the cavity, it is possible to invert the instrument for transportation, and thus relieve the step-bearing from the weight of the rotatable element and without danger of leakage of the lubricant. Since a very small amount of lubricant is required in the operation of the meter, the felt may be caused to absorb a sufficient quantity to properly lubricate the bearing during the life of the instrument.

I claim as my invention—

1. The combination with a shaft having an end recess and a tubular extension secured in said recess, of a bearing-pin that projects into said extension.

2. The combination with a shaft provided with an end recess and a tubular extension having two inner diameters, the end having the smaller inner diameter being seated in said recess, of a bearing-pin which projects into said extension and constitutes a bearing for the inner portion thereof.

3. The combination with a shaft provided with an end recess and a tubular extension having inner cylindrical bores differing in diameter, the end of the extension having the smaller diameter projecting part way into said recess, of absorbent and lubricating material in the bottom of said recess, and a bearing-pin that projects into said extension and constitutes a bearing for the end having the smaller diameter.

4. The combination with a shaft having an end recess and a tubular extension the inner surfaces of which differ in diameter, the end of the extension having the smaller inner diameter being secured in the end recess of the shaft, of a bearing-pin that projects into the tubular shaft extension and constitutes a bearing for the inner end thereof.

5. The combination with a shaft having a recess in one end, lubricant-saturated material in the bottom of said recess and a tubular extension having two inner diameters, the end having the smaller diameter being seated in the said recess, of an adjustable nut having a bearing-pin that projects into the shaft extension.

6. The combination with a shaft having an end recess, absorbent material located in the bottom of said recess, and a tubular shaft extension having one end seated in the said recess, of a bearing-pin that projects into said extension.

7. The combination with a rotatable shaft or spindle having a recess in its upper end and a body of absorbent material in the bottom thereof, of a rigidly-supported bearing-pin that projects downwardly into said recess.

8. In an electrical measuring instrument, the combination with a vertical spindle having a recess in its upper end and a body of absorbent material in the bottom thereof, of a bearing-pin that projects into said recess and into contact with said absorbent material.

9. In an electrical measuring instrument, the combination with a shaft or spindle having a recess in its upper end and a body of absorbent material and a lubricant in the bottom of said recess, of a stationary bearing-pin that projects into said recess.

In testimony where of I have hereunto subscribed my name this 27th day of June, 1904

WILLIAM M. BRADSHAW.

Witnesses:
PAUL MACGAHAN,
BIRNEY HINES.